United States Patent [19]

Robota et al.

[11] 4,299,606
[45] Nov. 10, 1981

[54] RECOVERY OF HF AND HCL FROM GASEOUS MIXTURES THEREOF

[75] Inventors: Stephen Robota, North Tonawanda; Alastair J. H. McGregor; Gregory A. R. Trollope, both of Lewiston, all of N.Y.

[73] Assignee: Hooker Chemicals & Plastics Corp., Niagara Falls, N.Y.

[21] Appl. No.: 866,661

[22] Filed: Jan. 3, 1978

Related U.S. Application Data

[63] Continuation of Ser. No. 755,873, Dec. 30, 1976, abandoned.

[51] Int. Cl.$^3$ .................................................. F25J 3/02
[52] U.S. Cl. ........................................... 62/28; 55/71
[58] Field of Search ............... 62/28, 32, 24, 20, 17; 55/71; 423/240

[56] References Cited

U.S. PATENT DOCUMENTS

| | | | |
|---|---|---|---|
| 2,345,696 | 4/1944 | Benning et al. | 55/71 |
| 3,254,474 | 6/1966 | Dijk | 55/71 |
| 3,859,372 | 1/1975 | Robota | 260/651 F |

FOREIGN PATENT DOCUMENTS

| | | | |
|---|---|---|---|
| 509629 | 1/1955 | Canada | 423/240 |
| 835853 | 3/1970 | Canada | 55/71 |

OTHER PUBLICATIONS

Chem. Abs., vol. 71, 1969, 72438n.

*Primary Examiner*—Hiram Bernstein
*Attorney, Agent, or Firm*—William J. Crossetta, Jr.; Arthur S. Cookfair

[57] ABSTRACT

A process is disclosed for recovering HF and HCl in substantially purified form from a gaseous mixture containing HF, HCl and halogenated organic vapors. The process comprises:

A. feeding the gaseous mixture to the lower part of a rectification column to provide an upward flow of gases therein, the column having a temperature in the upper part of from about $-40°$ C. to about $-85°$ C., and having a temperature in its lower part in the range of from about $-30°$ C. to about $19°$ C., the column also having a countercurrent flow of a liquid and a gas, B. withdrawing liquid HF from the bottom of the rectification column, C. withdrawing a gas from the top of the rectification column, and feeding the thus withdrawn gas to a condenser, D. condensing at least a portion of the withdrawn gas of step C to a liquid, E. feeding a portion of the condensed liquid of step D to the upper part of the rectification column, and F. recovering HCl gas from the condenser.

10 Claims, No Drawings

RECOVERY OF HF AND HCL FROM GASEOUS MIXTURES THEREOF

This is a continuation of application Ser. No. 755,873, filed Dec. 30, 1976, now abandoned.

BACKGROUND OF THE INVENTION

Off gases from many organic and inorganic processes comprise a mixture of HCl, HF, uncondensed organics and inorganics, which must be neutralized or otherwise disposed of in an environmentally and socially acceptable manner. Presently, the preferred method for disposing of these gases is subjecting them to a neutralization process. However, this is not an acceptable long term solution since neutralization processes produce soluble and insoluble chlorides and fluorides which may contribute to water pollution problems, or produce a sludge which must subsequently be disposed of in a landfill.

In examining alternatives to neutralization processes; social, ecological, and conservation considerations must be taken into account along with economic considerations. In this respect, one of the least desirable aspects of neutralization processes is that the neutralization products of HCl and IF are discarded. Although the combined HF/HCl off gas has little apparent industrial use, and is therefore of little commercial value, HCl and HF are individually useful for many industrial processes. Therefore, an optimum alternative system for the recovery of HF/HCl off gases would separate the HF from the HCl so that each component would be reusable in some commercial, industrial process. For this to be feasible, however, the cost of the recovery system must be such that the cost of regenerating HCl and HF is at least marginally competitive with HCl and HF available from present commercial sources. Furthermore, the HF and HCl must be separated from whatever other impurities are present in the off gases.

Aside from delivering economically affordable HF and HCl, the recovery system should be fairly simple to operate; avoid the use of supplementary extractants which complicate the process and add to operating costs; and operate at atmospheric or moderate pressures. In addition, the system should use standard, low cost construction materials. For example, dry HCl and anhydrous liquid or gaseous HF is currently handled in steel equipment. Introduction of any moisture obviously can cause severe corrosion problems, resulting in the need for high-cost corrosion resistance materials. The recovery system should be designed to avoid such problems.

Although many HF recovery processes have been proposed as substitutes for neutralization processes, none of them have the criteria for successful industrial applications. For example, in one proposed method vent gases containing HF which originate from a fluorination process to produce refrigerants are recovered by scrubbing the gases with concentrated sulfuric acid. This process is based on the absorption-desorption equilibrium, $H_2SO_4 + HF \rightleftharpoons HSO_3F + H_2O$. Pursuant to this method, vent gas containing HF, HCl and uncondensed organics is introduced at the bottom of a tower. Ninety eight percent concentrated sulfuric acid is sprayed at the top of the tower at ordinary temperature. The gaseous effluent leaving the top of the tower is introduced into an entrainment separator, and then washed with water to dissolve HCl. The gas is then cooled to 6° C. under a pressure and the organic product is separated by liquefaction. The concentrated sulfuric acid leaving at the bottom of the tower is heated to 120° C. and is recycled to the top of the tower after having been separated from HF, thus regenerating the absorbent. The major problem with this recovery scheme is that the $HF—HCl—H_2SO_4—H_2O$ environment is a highly corrosive atmosphere and consequently requires that the equipment would be made of expensive corrosion resistant materials. In addition, the recovered HF is contaminated with water and sulfuric acid originating from the stripping operation, and the HCl would be impure.

Another suggested process involves absorption of HF directly in fluosulfonic acid ($HSO_3F$). Many variations of this principle have been proposed, but all face the same corrosion and purity problems mentioned above.

In a third method, thirty eight percent muriatic acid is used to scrub out HF. A drawback to this technique is that the HF is recovered in an aqueous solution, from which it is difficult to isolate anhydrous HF. Although other absorbents are also suggested, such as fluorinated solvents, diphenylamine, benzophenone and dihydroxyfluoroboric acid, none of these can produce the HCl purity required because these absorbents act as contaminants in the HF and HCl.

The complexity of this extraction process is better appreciated by an example in which extraction is proposed from an aqueous solution with a secondary amine in a hydrocarbon solvent which is in turn extracted with aqueous KF in three stages to form $KHF_2$, and is then crystallized and calcined at 500° C. to produce anhydrous HF.

In another proposed method a gaseous mixture of HF and HCl is scrubbed in a jacketed tower with an aqueous solution containing $H_3BO_3$ and sufficient HCl to give partial pressure of HCl in the solution equal to that in gas mixture. The HF reacts with the $H_3BO_3$ to form $HBF_4$ which is retained in the scrubber liquor. Here previous problems of working with aqueous media are repeated in addition to the introduction of $H_3BO_3$ which could itself become a contaminant in the recovered HF.

Some of the proposed recovery processes are quite complex. For example there is one in which ammonium fluoride compounds are formed with HF. From the ammonium fluoride salt HF is recovered by thermal decomposition to obtain a gas containing ammonia and hydrogen fluoride. This is followed by further thermal decomposition of the ammonia to hydrogen and nitrogen and subsequently recovering hydrogen fluoride from the gaseous mixture. A modified process of recovering anhydrous hydrogen fluoride from aqueous ammonia fluoride solutions comprises heating the ammonium fluoride solution to a temperature sufficient to volatilize substantially all of the water and part of the ammonia to thereby form ammonium bifluoride. This ammonium bifluoride is then reacted with an alkali metal fluoride to produce an alkali metal bifluoride and HF is recovered by heating this alkali metal bifluoride to a temperature sufficient to yield an alkali metal fluoride and HF. No mention is made of HCl, which would yield ammonium chloride, and thus complicate the process further.

Other methods proposed include reaction with $Al_2O_3$, $Al(OH)_3$, or other reactants. In the former case $H_2O$ is a by-product with the net result that the problems encountered with aqueous media would be inherited. In this process, AlF$_3$ is formed and the reconversion to HF would have to be done chemically, which makes it economically unattractive. Other recovery processes envisioned are ion exchange, reaction with silica gel, and use of alkali fluorides. In this case the alkali bifluorides formed are then thermally decomposed. The workability of such systems is questionable and with the latter, high HF losses with HCl would result.

A procedure which avoids use of added reagents is high pressure fractionation. In a typical embodiment of such a system the HF-HCl off-gas is compressed to 225 psig in a 2 stage compressor system. The HCl-HF mixture is liquefied at a temperature of $-20°$ C. The resultant condensate is fed to a still operated at 225 psig to separate HF and HCl. There are many problems to operating such a process. Some of the difficulties in operation of a compression system are choice of resistant lubricants with HF and HCl, and decomposition of contained organics and selection of seals, gaskets and valve packing. Also all equipment, including storage tanks, would have to have a high pressure rating.

Still another HF recovery system suggests that a mixture of gaseous HF, HCl and chloro-fluorocarbons (paraffinic) be separated by anhydrous fractional distillation at $-50°$ to $-40°$ C. and 100 psig. to distill off HCl, settling the remaining mixture until it forms a layer of substantially anhydrous HF containing a minor portion of dissolved organic products and substantially pure organic layer. This process is susceptible to the many problems of a pressure fractionation process as noted.

SUMMARY OF THE INVENTION

In accordance with the present invention there is provided a process for the separation of hydrogen fluoride and hydrogen chloride, from a gaseous mixture thereof comprising:

A. Feeding the gaseous mixture to the lower part of a rectification column to provide an upward flow of gases therein, the column having a temperature in the lower part of about $-30°$ to about $19°$ Celsius, and having a temperature in the upper part of about $-85°$ to about $-40°$ Celsius;

B. Withdrawing liquid HF from the bottom of the rectification column;

C. Withdrawing gaseous HCl from the upper part of the rectification column;

D. Feeding liquid HCl to the upper part of the rectification column to provide a downward flow of liquid countercurrent to the upward flow of gases.

Preferably, the gaseous HCl from the upper part of the rectification column is fed to a condenser. The condenser is maintained at a temperature at which HCl condenses, normally at about $-85°$ Celsius or below at atmospheric pressure. Moderate variations in pressure may require appropriately corresponding adjustment in temperature to insure condensation. At least a portion of the liquid condensate formed therein, which is a mixture of HCl and minor amounts of HF, is recycled to the upper part of the rectification column where it enters the downward flow of liquid in the column and contributes to the cooling of the upper portion of the column.

The process of this invention is particularly useful in the separation and recovery of hydrogen fluoride, hydrogen chloride, and uncondensed organics or inorganics from the gaseous effluent of various fluorination processes. The composition of the gaseous mixture to be treated may vary considerably. Although the gaseous mixture to be treated may contain nearly any conceivable HF content, the preferred gaseous mixture comprises about 5 to about 50 percent by weight HF.

The hydrogen chloride content of the gaseous mixture may also vary as widely but is preferably in the range of about 20 to about 90 percent by weight of the mixture. The amount and nature of organic material present in the gaseous mixture will depend on the nature of the process from which the gaseous mixture effluent originates. Typically, the organic material will be present in a minor amount, such as less than about 25 percent by weight of the gaseous mixture. When the gaseous mixture originates as the effluent of a process for the fluorination of an organic material, the quantity of uncondensed organics present in the mixture will depend on the vapor pressure of the particular organic or halogenated organic at the process temperatures. Preferably the amount of organic vapors in the gaseous effluent to be treated will be about 0.01 to about 10 percent by weight.

The process of this invention has been found to be particularly effective in the separation and recovery of the components of gaseous effluent from fluorination processes wherein a chlorinated organic is reacted with hydrogen fluoride to replace the chlorine atoms thereof with fluorine. Typically such processes utilize an excess of HF, over the stoichiometric amount, with the result that the effluent gas comtains unreacted HF in addition to by-product HCl and halogenated organic vapors after product condensation. The process of this invention is most especially suitable for the separation and recovery of the components of gaseous mixtures of HF and HCl and vapors of organic materials having a freezing point of about $+20°$ to about $-60°$ Celsius or lower and preferably about $-30°$ to about $-45°$ Celsius. Typical of such gaseous mixtures is the effluent gas from the preparation of fluoromethyl aromatics, such as benzotrifluoride by reaction of chloromethyl aromatics, such as benzotrichloride, with hydrogen fluoride. In one embodiment, the process of the present invention may be employed as a recovery step in conjunction with a fluorination process such as the process disclosed in U.S. Pat. No. 3,859,372 for the preparation of organic fluorine compounds.

The initial temperature of the gaseous mixture may vary considerably and may for example, range from about $-50°$ to about $50°$ Celsius. It is preferred however, that the initial temperature of the gaseous mixture be about $-20°$ to about $20°$ Celsius prior to feeding the mixture into the lower part of the rectification column.

Although the process of this invention is preferably conducted at approximately atmospheric pressure, the initial pressure of the gaseous mixture may be elevated slightly, for example on the order of 0 to about 10 psig, to overcome the back pressure of the recovery system.

The rectification column may contain packing such as carbon rings, metallic or plastic saddles, etc. Alternately it may have siev trays, valve trays or bubble cap trays. Inside the column the gas-liquid flow is countercurrent, the rising gas flow is contacted by a downward flow of liquid. The lower part of the rectification column is maintained at a temperature of about $-30°$ to about $19°$ Celsius through control of the flow of liquid HCl to the top of the column. In the upper part of the column the descending liquid comprises an HF-HCl mixture containing a high percentage of HCl. Although the reflux temperature, that is, the temperature in the upper part of the rectification column; can be anywhere from −40° to −85° C. depending on the HF recovery desired, it is highly desirable that this reflux temperature be as low as possible to ensure adequate condensation in the column, because this cold descending stream from the upper plates causes condensation of the ascending HF vapor and rectification at the HF-HCl mixture. Preferably, a minimum of two to three theoretical plates is used.

The gas leaving the upper part of the rectification column is fed to condenser. The function of the condenser is to remove all or most of the remaining HF and permit a relatively pure HCl gas product to be withdrawn therefrom. The amount of HF in the HCl gas product leaving the condenser depends on the temperature of the vapors leaving the upper portion of the column. Preferably, the condenser is maintained at a temperature of below about −85° C. to effect HCl condensation. The liquid condensate, comprising HCl and minor amounts, such as up to about 3 mole percent of HF is returned to the upper part of the rectification column to enter the cold, descending liquid stream. The descending liquid stream serves additionally to provide a scrubbing action to remove organic materials that have been carried upward by the rising gas. At the bottom of the rectification column a liquid phase is withdrawn which comprises HF and organic material, relatively free of HCl.

The condenser can be an ordinary shell and tube design, with the coolant on the shell side. As a refrigerant there may be employed any of the commercial chloro-fluoro carbons used as gas or liquid. If fed as a liquid to the condenser it should then have a boiling point below but still close enough to the desired condenser operating temperature. The refrigerant in the condenser causes most of any remaining HF and a sufficient amount of HCl to condense out to provide adequate reflux flow to cool the upper part of the rectification column to the desired low temperature. Liquid HCl from a separate source may also be added to the condenser to increase the condensation of HF. In this instance it is preferred to also provide a separate stream of liquid HCl to the upper portion of the column. The amount of HF present in the HCl gases exiting the condenser will depend on the temperature of the exiting gases and the temperature of liquid HCl in the condenser. Typically the exit gases from the condenser will be preferably about −60° to about −85° C.

The liquid HF stream withdrawn at the bottom of the column may be transferred to a storage tank. The liquid, containing HF and organic materials may be allowed to settle forming two separate layers. These two liquid layers can be separated by conventional procedures.

In an alternative method of recovering high purity HF, a relatively pure liquid HCl may be fed into the top of the rectification column at such a rate that all the HF in the gaseous feed stream is condensed. This alternative method would eliminate the need for a condenser. The HCl gas stream issuing from the top of the column is then a mixture of the HCl from the HF-HCl feed stream and the auxiliary liquid HCl feed stream. Under such conditions the gas stream recovered from the top of the column will then contain only traces of HF and can thus be utilized.

Thus this invention provides a process whereby a mixture of HF, HCl and organic vapors can be separated and purified to obtain nearly pure components.

The separation is such that a liquid HF-organic mixture is obtained at the bottom of the rectifying column, the mixture being readily separated into its components by gravity. To the top of the column is fed either (a) liquid HCl, that may contain various amounts of HF, that was collected in a condenser after column vapors pass through it or (b) auxiliary liquid HCl. This should provide exit vapors from the condenser high in HCl (greater than 99 wt. % possible), and liquid HF which is substantialy free of HCl.

The effectiveness of this recovery process results from the unexpected properties of the HF-HCl system under the proposed conditions of operation. As a result, simple equipment and conditions result in better recovery and purity of HF and HCl than expected from published data. It is thus possible to rectify efficiently a substantially anhydrous HF-HCl mixture in standard equipment, such as steel, so as to give a low percentage of HF in the gas stream leaving condenser and low HCl content in the liquid HF leaving at the bottom of the column.

The effectiveness of the process of this invention is demonstrated by comparison with the results obtained from simple condensation of a gaseous mixture of HF and HCl shown in the examples below. Example 1 sets forth the results obtained through a simple condensation without benefit of the process of this invention. Example 2 sets forth the results obtained when the separation process of this invention is employed. In the examples, unless otherwise indicated, all temperatures are in degrees Celsius and all parts and percentages are by weight.

EXAMPLE I

HF and HCl gases were mixed and fed into a copper coil immersed in a cooling bath consisting of an acetone-trichloroethylene mixture cooled with dry ice. The composition of the HF-HCl gaseous mixture varied from 8 to 45 percent HCl. The bath was agitated to prevent the formation of thermal layers. The gases were passed through the copper coil immersed in the cold bath. The HF condensed out and was collected in a pipe below the bottom of the bath. The liuid phase was then externally vaporized. The vapor phase exited from the top of the coil.

The exit vapor from the coil and vaporized liquid HF were sampled and analyzed for HF and HCl under each temperature condition. About three samples were taken from each sampling point at each temperature. The gas samples were absorbed in N/1 sodium hydroxide and water for titration for HF and HCl. The atmospheric pressure, the temperature of the cold bath and the temperature of the vapor-liquid stream were all measured at the time of sampling.

For example at a bath temperature of −70° C., 55 grams of HF and 228 grams of HCl were fed during a period of 65 minutes. This corresponds to a feed rate of 3.51 g/min of HCl and 0.85 g/min of HF, that is 20 wt. % HF in the inlet gas. For this run the exit gas analyzed only 2.2 wt. % HF. The amount of HF collected as liquid in the receiver was 50 grams.

Results obtained are tabulated below:

| Condensation Temperature °C. | % HF by Weight Analyzed | |
|---|---|---|
| | Condensed HF | Exit Gas |
| −1.1 | 98.2 | 57.3 |

-continued

| Condensation Temperature °C. | % HF by Weight Analyzed | |
|---|---|---|
| | Condensed HF | Exit Gas |
| −20.6 | 98.2 | 32.6 |
| −22.6 | 97.3 | 28.9 |
| −40.6 | 96.6 | 13.3 |
| −41.0 | 96.2 | 12.6 |
| −50.5 | 95.2 | 7.3 |
| −51.1 | 95.9 | 7.0 |
| −60.6 | 94.0 | 3.7 |
| −61.6 | 93.3 | 3.4 |
| −70.6 | 89.1 | 2.2 |
| −70.7 | 89.6 | 2.5 |
| −75.6 | 87.4 | 1.8 |
| −75.6 | 87.0 | 1.4 |

The other consituent being HCl.

If the percent HF in vent gas is calculated from known vapor pressure curves, at condensation temperatures, the percent HF in vent gas is different, as shown below:

Calculated % HF in vent gas based on known vapor pressure of HF (at 760 mm Hg total pressure):

| Temperature −°C. | % HF in Vent Gas Wt % |
|---|---|
| −40 | 3.8 |
| −50 | 2.1 |
| −60 | 1.1 |
| −70 | 0.5 |
| −75 | 0.3 |

From a comparison of the above data, it will be seen that HF-HCl mixtures are a non-ideal gas system. It will be further seen that in practice, in a simple condensation, as the condensation temperature is lowered the purity of HCl recovered in the exit gas increases while the purity of the HF condensate decreases. Thus, a simple condensation at any given temperature is ineffective for the recovery of both high purity HF and high purity HCl from gaseous mixtures.

The gaseous mixture was then fed to an HF-HCl recovery system, comprising a rectification column and a condenser and the components of the mixture were separated as follows:

The gaseous mixture was fed directly to the bottom of an insulated column constructed of mild steel and containing two plates, 6 inches apart, each with one bubble cap. The diameter of the plates and bubble cap were 6 inches and 3.5 inches respectively. The uncondensed gases passed upward through the column and then to a condenser. Condensed liquid returned as reflux to the top of the column providing a downward flow of cold liquid and forming a liquid seal at the plates. The depth of liquid on each plate under normal operation was about 1.25 inches and the height of the teeth of each bubble cap was about 0.25 inches, giving a liquid seal of about 1 inch. The entering gases were cooled on contact with the liquid on the plates. Part of the vapor condensed out to form a liquid consisting mainly of HF with minor amounts of organics. The liquid was withdrawn through a liquid seal at the bottom of the column and passed to a holding tank where the HF and organics were allowed to separate by gravity to form two liquid layers.

The vapor from the top of the column passed through the condenser located above the column. The condenser consisted of a 6 ft. long, ¾ inch diameter tube immersed in a bath containing a mixture of acetone and trichloroethylene cooled with dry ice. Agitation was provided to the bath to eliminate any thermal layers. For each run there were two phases of operation. The first phase was used to fill the plates in the column and the liquid seal below the column. The second phase consisted of operating the system under steady temperature and flow conditions and taking the necessary samples. During a run the HF concentration in the vapor to the column, the vapor exiting from the condenser and the vaporized liquid from the bottom of the column were sampled and analyzed from HF.

The results as set forth in the Table below demonstrate the efficiency of separation of HF and HCl achieved. Some of the typical results obtained are shown in Table I.

TABLE I

HF=HCl Recovery System

| | Temperature °C. | | | Liquid Exit From Bottom of Column | HF concentration - % | | Liquid Exit from Bottom of Column Wt. % |
|---|---|---|---|---|---|---|---|
| Gas Inlet to Column | Condenser Bath | Gas Exit From Condenser | | | Gas Feed to Bottom of Column Wt. % | Gas Exit From Condenser Wt. % | |
| 18 | −74 | −53 | | −5 | 29 | 9.8 | 96.5 |
| 25 | −72 | −63 | | 5 | 19.5 | 3.4 | 98.5 |
| 22 | −73 | −62 | | 3 | 35 | 2.2 | 97.8 |

EXAMPLE II

A gaseous mixture of HCl and HF, containing 20 to 35 weight percent HF and saturated with organics at 0° C., was prepared as follows:

Streams of HF and HCl were mixed, at a rate of about 1.3 pounds per hour HF and 4.5 pounds per hour HCl, and the mixture sparged into a heated tank containing fluorinated organics (benzotrifluoride), to saturate the mixture. The gaseous mixture was then passed through a vertical water cooled condenser and condensed organics returned to the tank. The saturated gaseous mixture simulated a process off-gas from a fluorination process for the preparation of benzotrifluoride.

I claim:

1. A substantially anhydrous process for separating HF and HCl from a gaseous mixture thereof comprising
   A. feeding the gaseous mixture to the lower part of a rectification column, to provide an upward flow of gases therein, the column having a temperature in the upper part of from about −40° C. to about −85° C., and having a temperature in its lower part in the range of from about −30° C. to about 19° C., the column also having a countercurrent flow of a liquid and a gas, B. withdrawing liquid HF from the bottom of the rectification column, C. withdrawing a gaseous HCl from the upper part of the rectification column, D. feeding liquid HCl to the upper part of the rectification column to provide a downward flow of liquid countercurrent to the upward flow of gases.

2. A process according to claim 1 for separating HF and HCl from a gaseous mixture thereof comprising A. feeding the gaseous mixture to the lower part of a rectification column to provide an upward flow of gases therein, the column having a temperature in the upper part of from about −40° C. to about −85° C., and having a temperature in its lower part in the range of from about −30° C. to about 19° C., the column also having a countercurrent flow of a liquid and a gas, B. withdrawing liquid HF from the bottom of the rectification column, C. withdrawing a gas from the top of the rectification column, and feeding the thus withdrawn gas to a condenser, D. condensing at least a portion of the withdrawn gas of step C to a liquid, E. feeding at least a portion of the condensed liquid of step D to the rectification column in the upper part of the column, F. recovering HCl gas from the condenser.

3. A process according to claim 1 for separating HF, HCl and halogenated organic compounds from a gaseous mixture thereof comprising A. feeding the gaseous mixture to the lower part of a rectification column to provide an upward flow of gases therein, the column having a temperature in the lower part of about −30° C. to about 19° Celsius, and having a temperature in the upper part of about −85° to about −40° Celsius;

B. withdrawing a gas from the upper portion of the rectification column, and feeding the withdrawn gas to a condenser;

C. condensing at least a portion of the withdrawn gas of step B to a liquid,

D. feeding at least a portion of the liquid of step C to the upper part of the rectification column to provide a downward flow of liquid, countercurrent to the upward flow of gases, E. withdrawing HCl gas from the condenser, F. withdrawing a liquid mixture of HF and halogenated organic compounds from the bottom of the rectification column, G. transferring the liquid mixture of step F to a settling tank and separating the mixture by gravity into a liquid HF phase and a liquid halogenated organic phase.

4. A process according to claim 3 wherein said halogenated organic compounds are characterized by a freezing point of about −60° to about 20° Celsius.

5. A process according to claim 4 wherein said gaseous mixture comprises less than about 25 percent by weight of said halogenated organic compounds.

6. A process according to claim 5 wherein said gaseous mixture comprises the effluent gas from a process for the fluorination of a chloromethyl aromatic compound by reaction with hydrogen fluoride.

7. A process according to claim 6 wherein said halogenated organic compound is a benzotrihalide.

8. In a process which comprises reacting a chloromethyl aromatic compound with an excess of hydrogen fluoride to form a fluoromethyl aromatic compound, the improvement which comprises treating the off-gas therefrom, comprising a gaseous mixture of HF, HCl and fluoromethyl aromatic vapors, by a substantially anhydrous process comprising A. feeding the gaseous mixture to the lower part of a rectification column, to provide an upward flow of gases therein, the column having a temperature in the upper part of from about −40° C. to about −85° C., and having a temperature in its lower part in the range of from about −30° C. to about 19° C., the column also having a countercurrent flow of a liquid and a gas, B. withdrawing liquid HF from the bottom of the rectification column, C. withdrawing a gaseous HCl from the upper part of the rectification column, D. feeding liquid HCl to the upper part of the rectification column to provide a downward flow of liquid countercurrent to the upward flow of gases.

9. A process according to claim 8 wherein the gaseous HCl withdrawn from the upper part of the rectification column is fed to a condenser and at least a portion of gaseous HCl is condensed therein and the liquid returned to the upper part of the column to provide the liquid HCl of Step (D) and HCl gas is recovered from the condenser.

10. A process according to claim 9 wherein the gaseous mixture entering the lower part of the rectification column comprises HF, HCl, and benzotrifluoride vapors.

* * * * *